Figure 1:
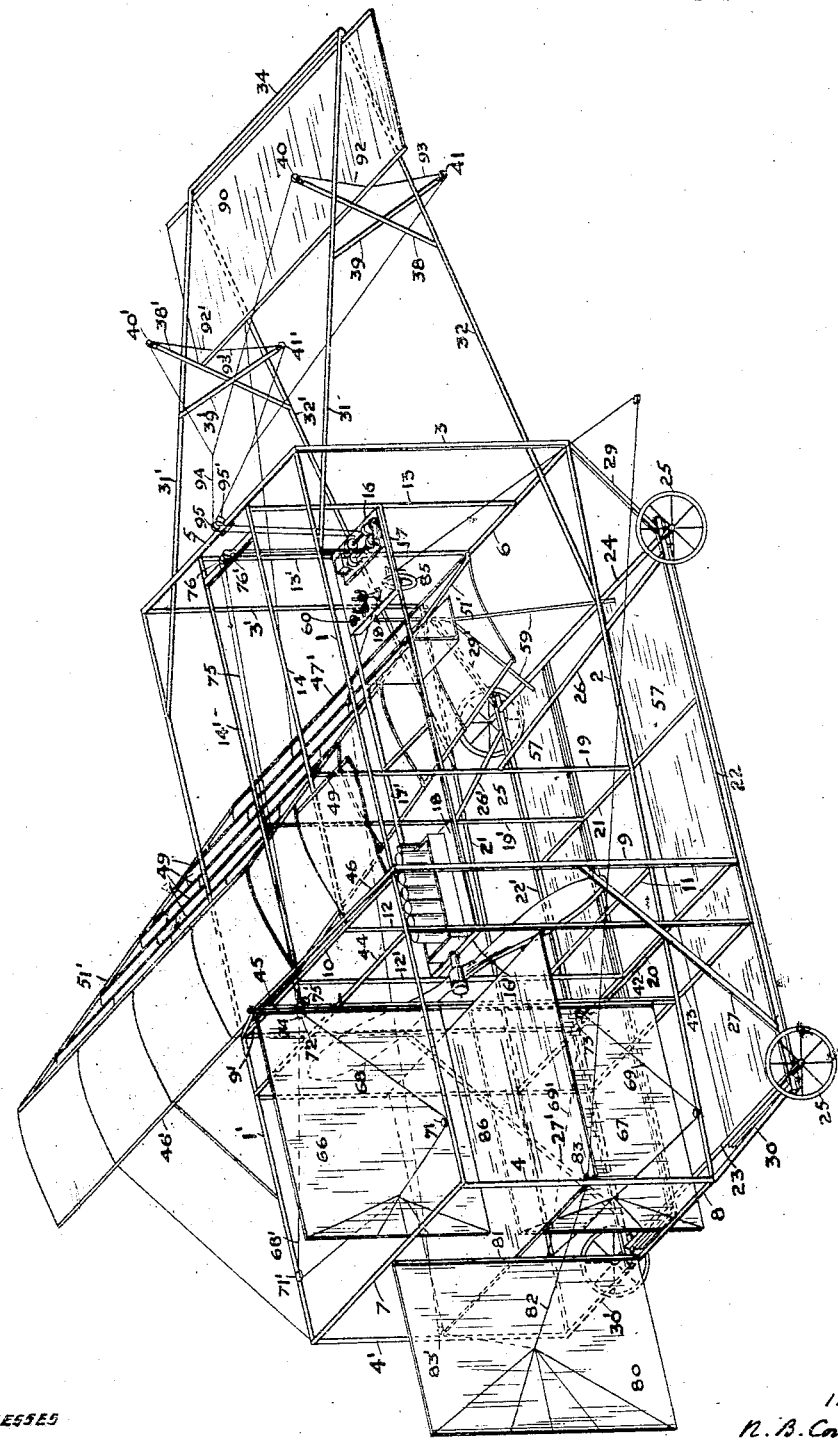

N. B. CONVERSE.
FLYING MACHINE.
APPLICATION FILED JUNE 6, 1910.

1,068,110.

Patented July 22, 1913.
10 SHEETS—SHEET 1.

WITNESSES

INVENTOR
N. B. Converse
By J. M. Wright
Attorney

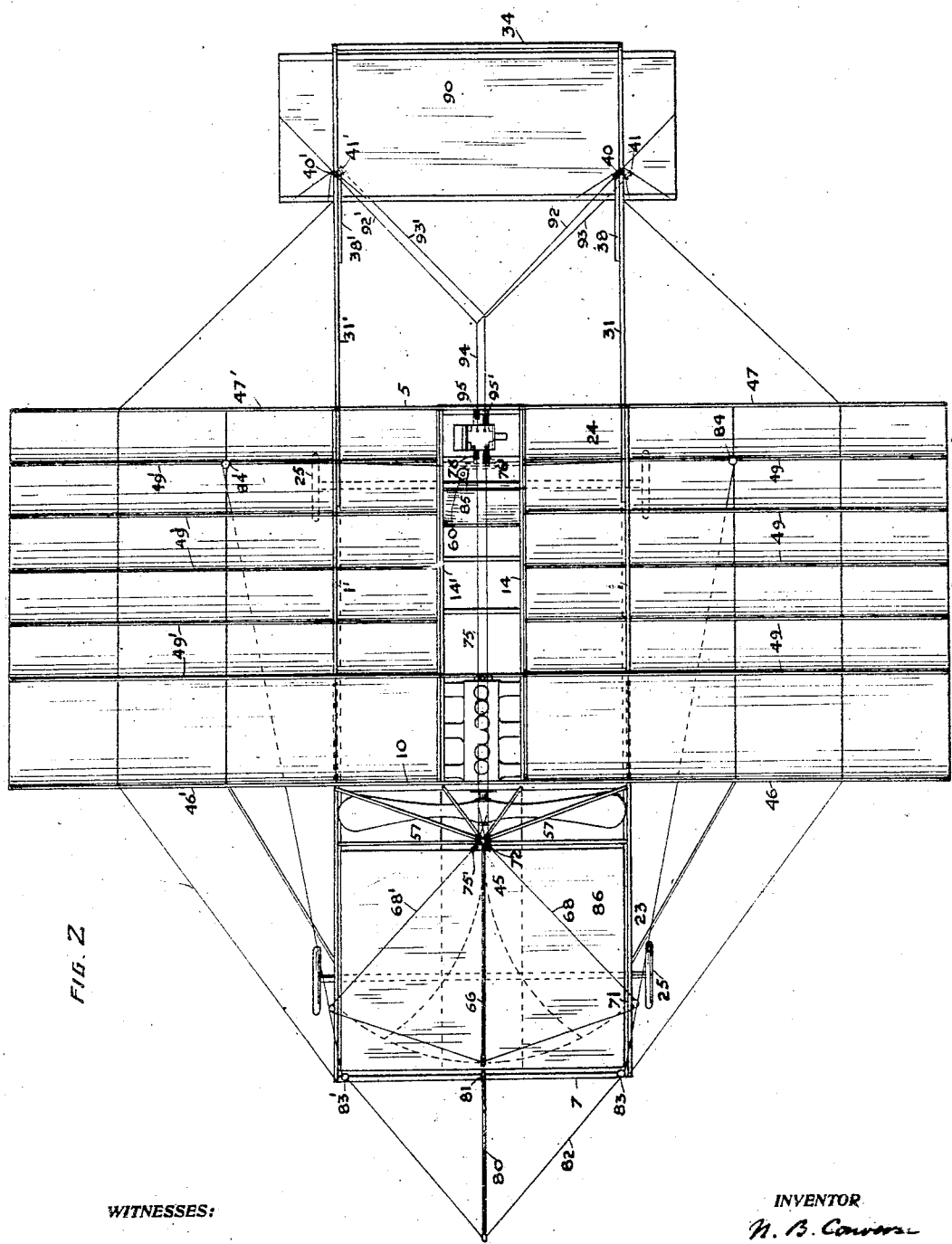

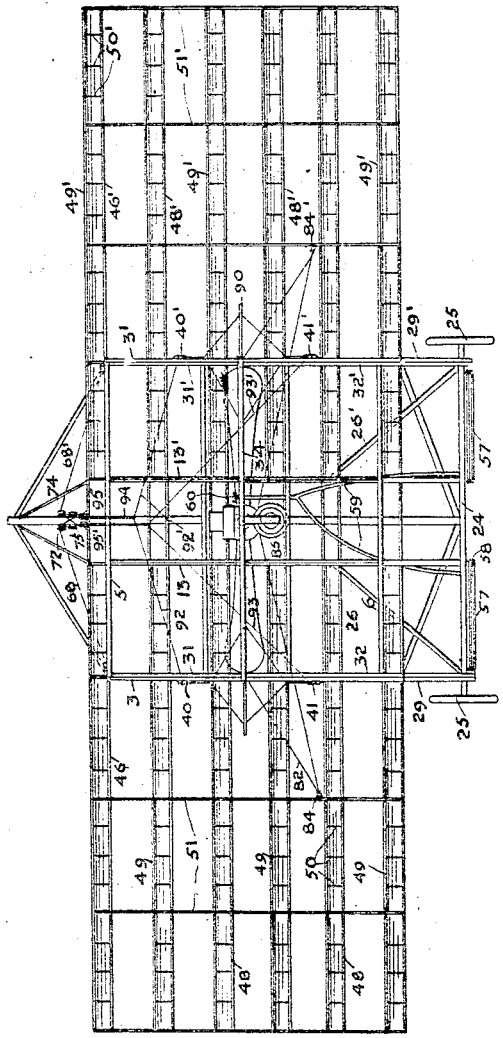

N. B. CONVERSE.
FLYING MACHINE.
APPLICATION FILED JUNE 6, 1910.
1,068,110.
Patented July 22, 1913.
10 SHEETS—SHEET 4.
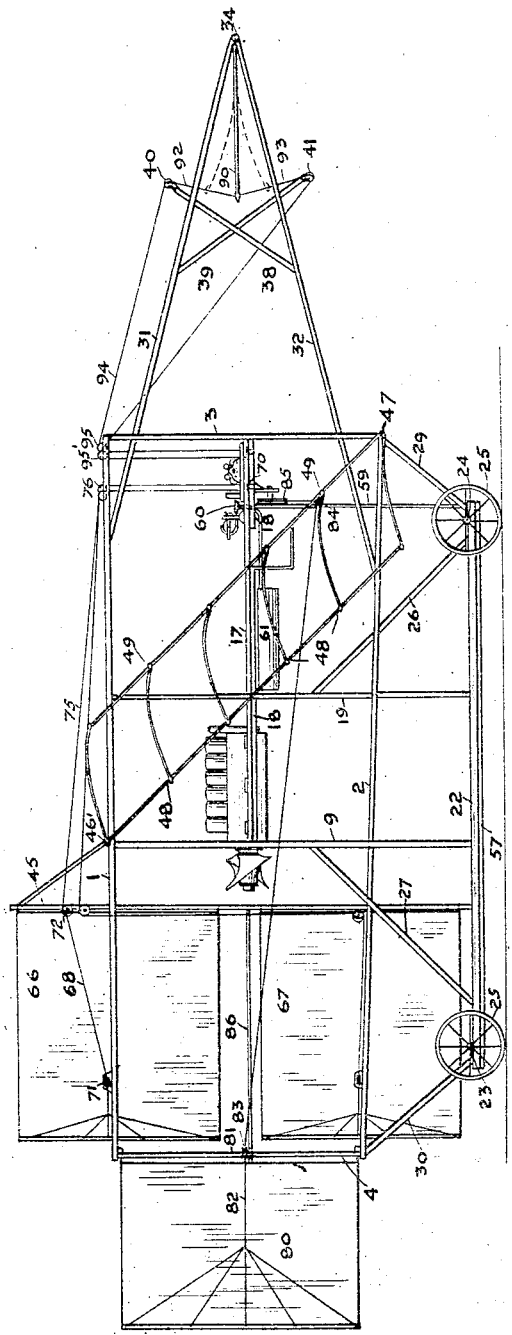
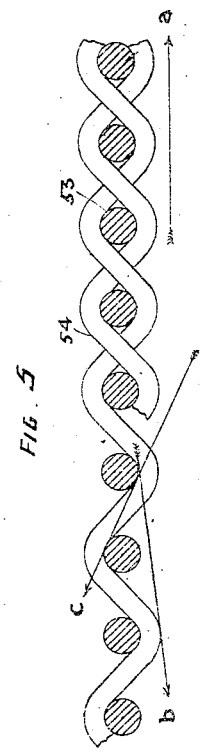
WITNESSES:
N. B. Keating
Leon Boilot
INVENTOR
N. B. Converse
BY
F. M. Wright
ATTORNEY N. B. CONVERSE.
FLYING MACHINE.
APPLICATION FILED JUNE 6, 1910.
1,068,110.
Patented July 22, 1913.
10 SHEETS—SHEET 5.
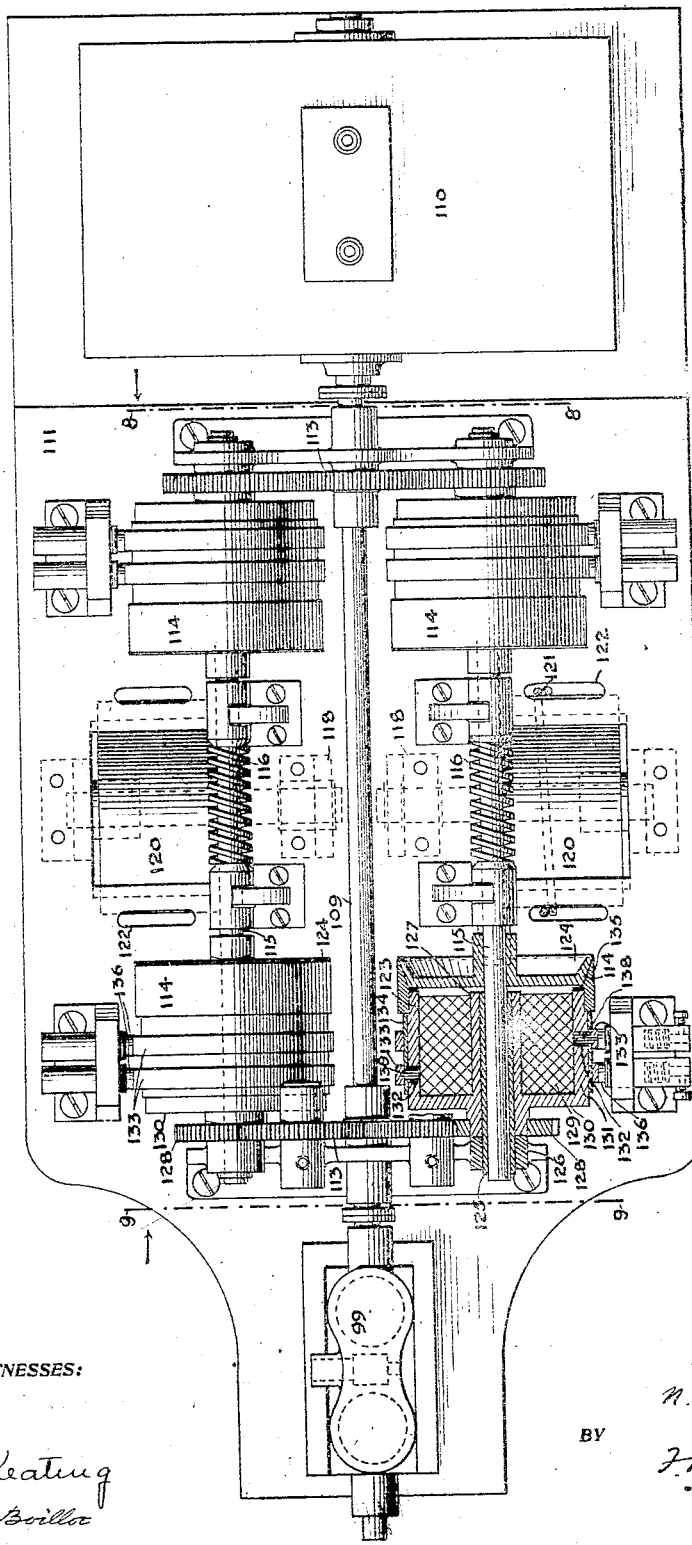
WITNESSES:
N. B. Keating
Leon Boillot
INVENTOR
N. B. Converse
BY
F. M. Wright
ATTORNEY

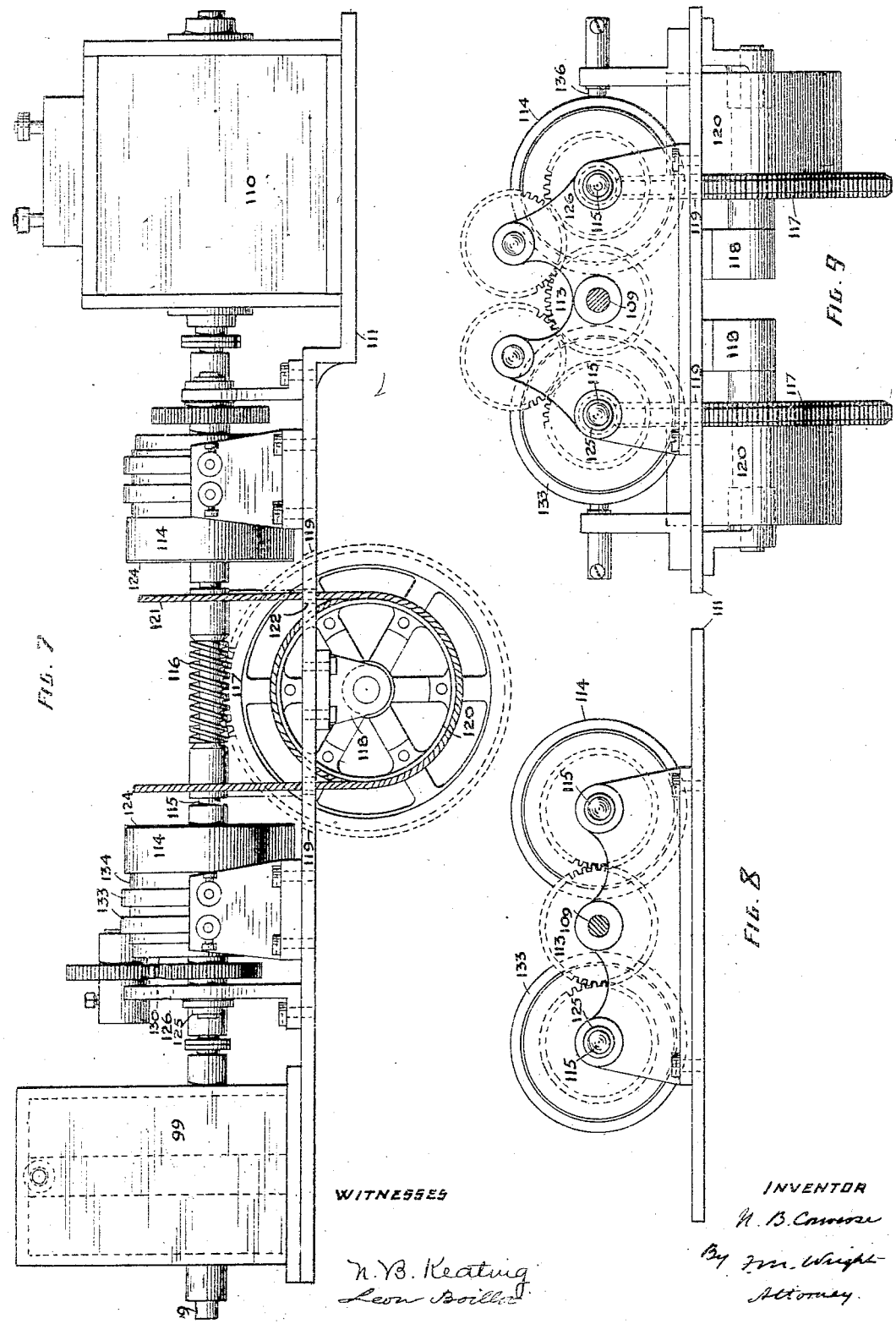

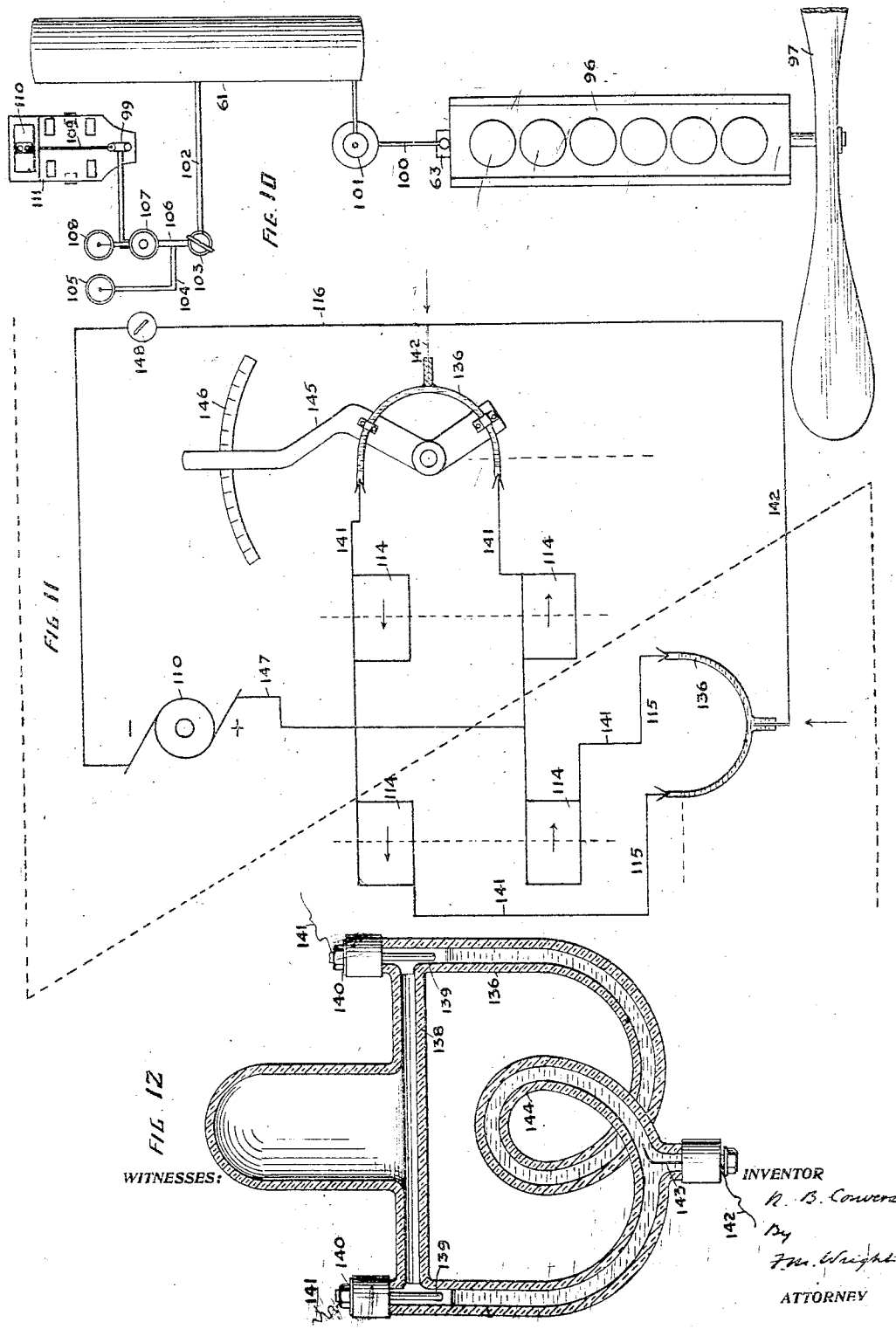

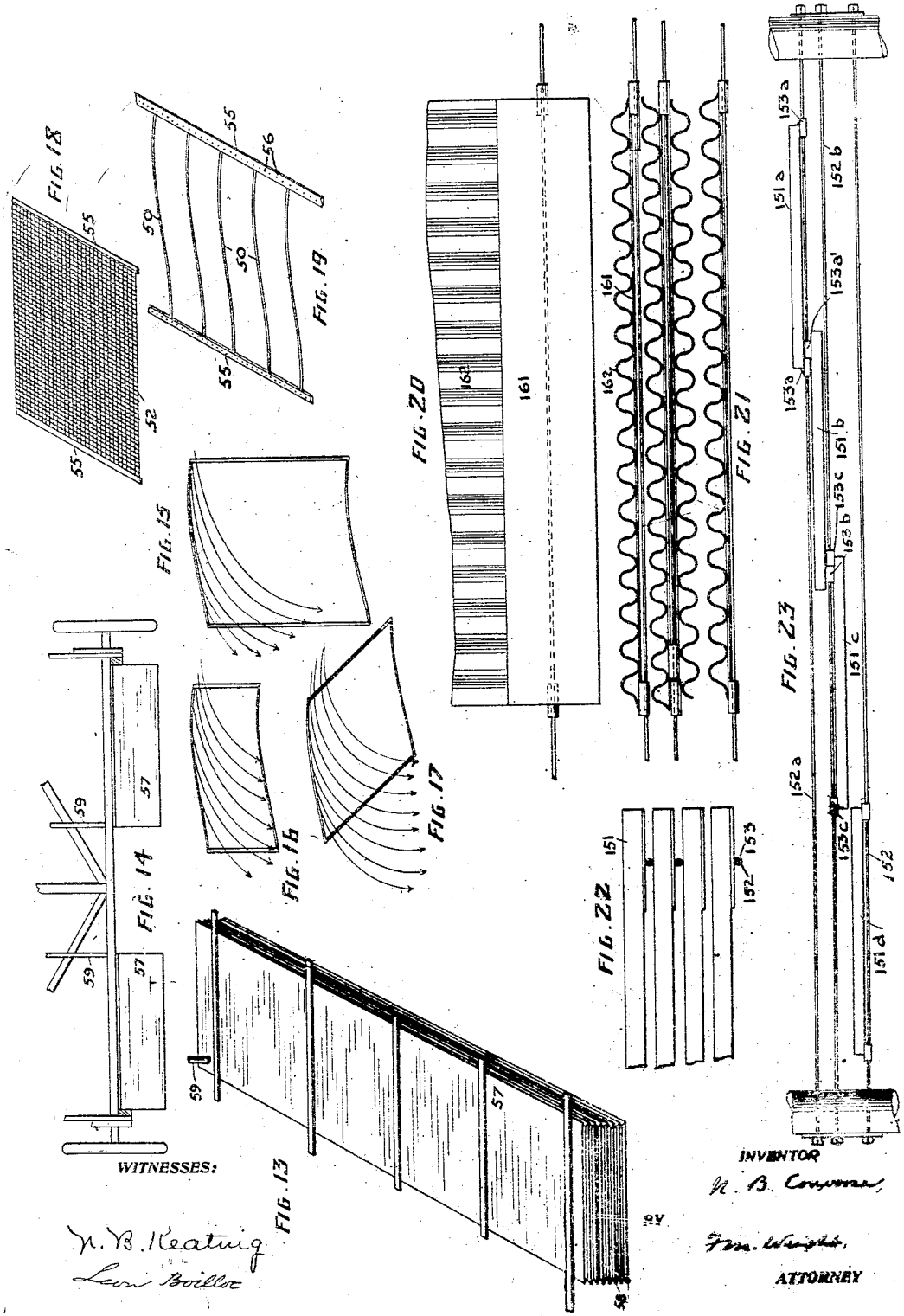

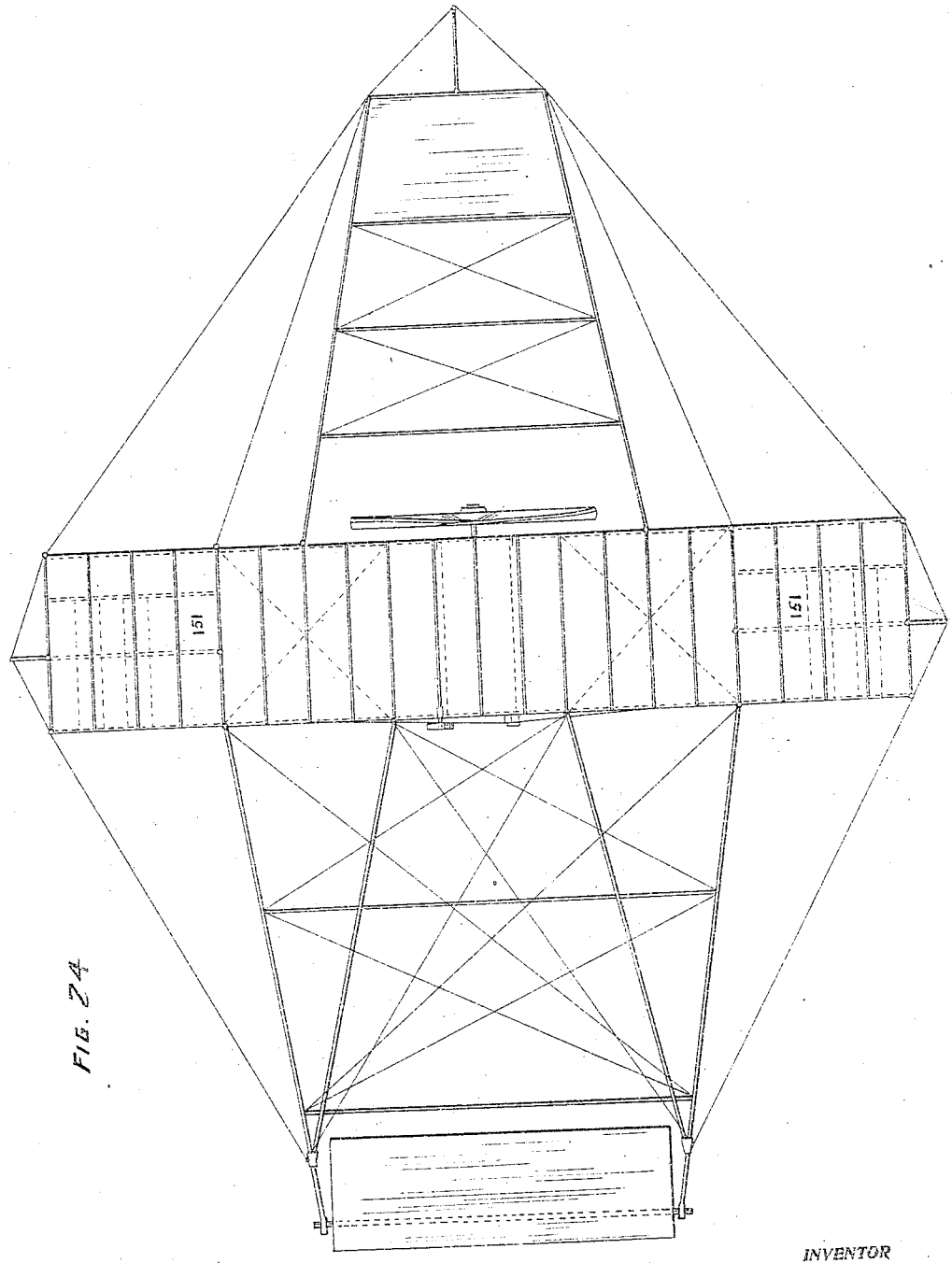

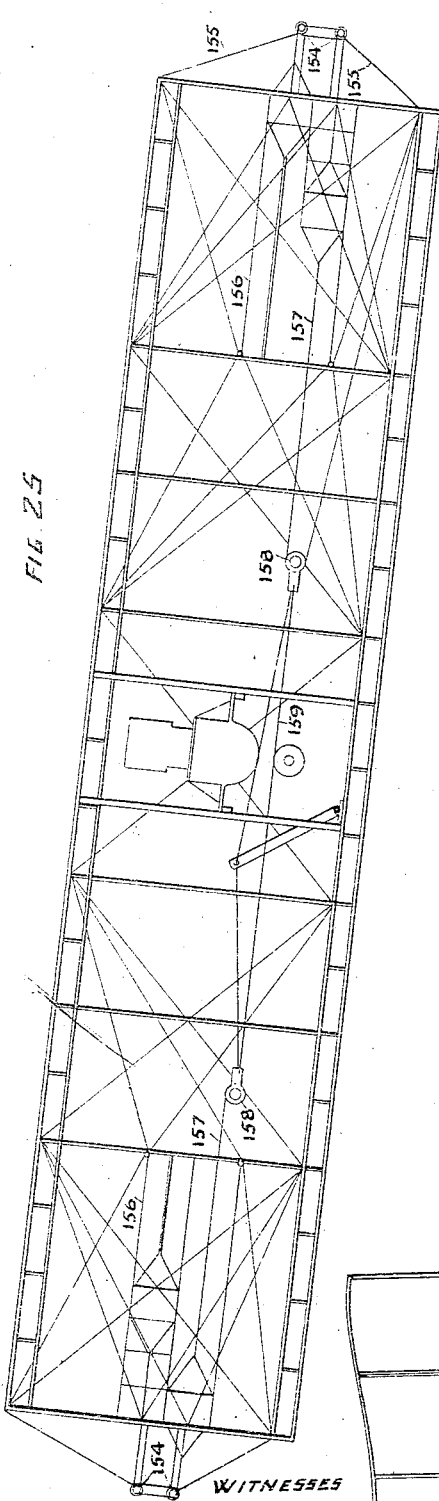
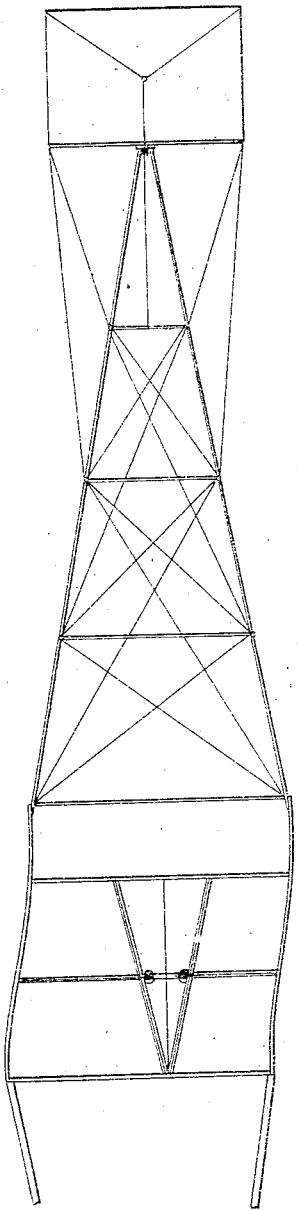
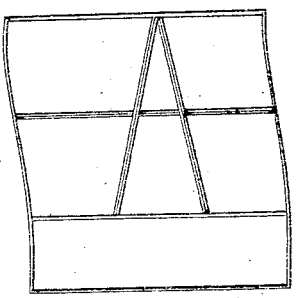

UNITED STATES PATENT OFFICE.

NEWTON B. CONVERSE, OF FRESNO, CALIFORNIA, ASSIGNOR TO HIMSELF, AS TRUSTEE.

FLYING-MACHINE.

1,068,110.　　　　Specification of Letters Patent.　　Patented July 22, 1913.

Application filed June 3, 1910. Serial No. 565,255.

*To all whom it may concern:*

Be it known that I, NEWTON B. CONVERSE, a citizen of the United States, residing at Fresno, in the county of Fresno and State of California, have invented new and useful Improvements in Flying-Machines, of which the following is a specification.

The present invention relates to improvements in flying machines, the objects of the invention being to provide a machine of this kind which will automatically maintain its equilibrium, when exposed to varying air currents.

A further object is to provide in such a machine a novel construction of aeroplanes which shall be more efficient for a given weight and quantity of material.

A further object is to provide an improved construction of the material from which the aeroplanes are formed.

In the accompanying drawings, Figure 1 is a perspective view of the flying machine, part of the nearer side being broken away; Fig. 2 is a plan view of the same; Fig. 3 is a rear view of the same; Fig. 4 is a side view of the same; Fig. 5 is an enlarged detail sectional view showing the improved construction of the sheet material used in said aeroplanes; Fig. 6 is a plan view of the controlling mechanism, part being shown in section; Fig. 7 is a side view of said controlling mechanism; Fig. 8 is a vertical section on the line 8—8 of Fig. 6; Fig. 9 is a similar section on the line 9—9 of Fig. 6; Fig. 10 is a diagrammatic view of the arrangement of the machinery used for propelling and controlling the air ship; Fig. 11 is a diagrammatic view of the electrical connections; Fig. 12 is an enlarged vertical section of the circuit controller; Fig. 13 is a perspective view of the air bags collapsed; Fig. 14 is a rear view of the lower portion of the machine showing said air bags collapsed; Figs. 15, 16, and 17 are diagrams illustrating respectively the old construction of aeroplanes, a construction intermedia between the old and new, and my new and improved construction thereof; Fig. 18 is a perspective view of a portion of an aeroplane; Fig. 19 is a detail perspective view showing the construction of the aeroplane; Fig. 20 is a plan view of a modified form of aeroplane; Fig. 21 is a front view thereof; Fig. 22 is an end view thereof; Fig. 23 is a front view showing the aeroplane expanded; Fig. 24 is a plan view of a modified form of air ship; Fig. 25 is a front view thereof; Fig. 26 is a side view or portion thereof; Fig. 27 is a detail side view of said modification.

The main frame of the aeroplane comprises two upper longitudinal rods 1, 1′, two lower longitudinal rods 2, 2′, two vertical rods 3, 3′, connecting the front ends of said longitudinal rods, two vertical rods 4, 4′, connecting the rear end of said longitudinal rods, upper and lower front transverse rods 5, 6, and upper and lower rear transverse rods 7, 8. The lower longitudinal rods 2, 2′, are not parallel to the upper longitudinal rods 1, 1′, but incline downwardly forward, so that the vertical rods 3, 3′ are longer than the vertical rods 4, 4′.

The car frame comprises two vertical rods 9, 9′, and upper and lower transverse rods 10, 11 connecting said longitudinal rods slightly to the rear of their middle points. Said transverse rods 10, 11 are connected at points near the center by vertical rods 12, 12′ and the transverse rods 5, 6, are similarly connected by vertical rods 13, 13′. The upper ends of said rods 12, 13, and 12′, 13′ are connected by parallel longitudinal rods 14, 14′. At about the middle of their height the rods 13, 13′, 12, 12′, are connected by transverse rods 16, 16′. The points of juncture of the rods 12, 12′, with the rod 16′ are connected to the points of juncture of the rods 13, 13′ with the rod 16, by longitudinal rods 17, 17′ which form the side supports of a platform or car 18, which carries the operating mechanism. Said platform 18 is additionally supported by vertical rods 19, 19′ connected at their upper ends to the longitudinal rods 14, 14′.

To form the wheel frame, the vertical rods 9, 9′, 12, 12′ are extended downward and to the lower ends thereof is connected a transverse rod 20. The rods 19, 19′ are also extended downward to the same level as the transverse rod 20 and are connected by a transverse rod 21. The ends of said transverse rods 20, 21, are connected by longitudinal rods 22, 22′. The ends of said rods 22, 22′ support bearings for transverse shafts 23, 24, upon which are mounted wheels 25. The front ends of said longitudinal rods 22, 22' are connected by oblique braces 26, 26' to the vertical rods 19, 19' and the rear ends are connected by oblique braces 27, 27' to the vertical rods 9, 9', and to the longitudinal rods 2, 2', at points to the rear of the points of juncture of said rods with the rods 9, 9'. The front ends of the longitudinal rods 22, 22' are also connected to the front ends of the longitudinal rods 2, 2', by oblique braces 29, 29'. The rear ends of said rods are connected by oblique braces 30, 30'.

The front elevator rudder frame comprises upper oblique rods 31, 31', connected obliquely to the rods 1, 3, and 1', 3' respectively and extending forwardly downward, and lower oblique rods 32, 32' connected obliquely to the rods 2 and 3, and 2', 3', respectively and extending forwardly upward, and being connected respectively to the rods 31, 31', at their front ends and also to a transverse rod 34. The rods 31, 31' are connected with the rods 32, 32' by oblique rods 38, 38', 39, 39'. All of said rods 38, 38', 39, 39' are extended past their points of juncture with the rods 32, 31, and carry at the said extended ends upper pulleys 40, 40', and lower pulleys 41, 41'.

The balancing rudder frame comprises, in one vertical plane, a transverse rod 42 connecting the points of juncture of the rods 2, 2' with the oblique braces 27, 27', a transverse rod 43 connecting the longitudinal rods 22, 22', and a transverse rod 44 connecting the longitudinal rods 1, 1'. Connected to the centers of said rods 44, 42, 43, is a vertical rod 45, from which extend rearwardly the balancing rudders.

The transverse rod 10 is extended laterally a considerable distance on each side of the flying machine, as shown at 46, 46', and the transverse rod 6 is similarly extended, as shown at 47, 47', forming the main aeroplane spars. In addition to these there are five others, 48, 48', on each side of the machine, forming with these spars 46, 46' the rear spars of the aero-planes, and five others, 49, 49', on each side of the machine, forming with the spars 47, 47', the six front spars on each side of the aero-planes. These spars are connected to the frame rods 14, 14', 17, 17', and the rear spars are connected to the corresponding front spars by sheet material, the nature of which is hereinafter described, and thus form six aero-planes on each side of the ship.

An improved feature of the invention resides in the construction and arrangement of these aeroplanes. They are arranged in echelon, that is, each upper plane overlapping or partly covering the rear portion of the next lower plane. By this arrangement, the aeroplanes can be placed close together without causing the air deflected downward from the under surface of an upper plane to strike and bear downward upon the upper surface of the plane immediately below it. This improvement is illustrated in detail in Figs. 15, 16, 17.

Fig. 15, shows the Wright and Chanute form of arranging the planes in a bi-plane, the arrows in said figure showing how the air is deflected after striking the under surface of the plane. With this construction it is necessary to space the upper and lower planes at a distance equal to the depth of said planes. By the term "depth" I mean the dimension from front to rear. For, if as will be seen from Fig. 16, the planes are spaced apart one-half of the depth of said planes, then, as shown by the arrows, the air deflected from the lower surface of an upper plane strikes and bears down upon the upper surface of the plane immediately below it, thus destroying the lifting power of one plane.

In Fig. 17 is shown my improved method of placing the planes, the lower plane one-half, or thereabout, of its depth ahead of the upper plane. With this arrangement the air impinging upon the lower surface of the upper plane is allowed a free exit downward and rearward. By thus arranging the planes I am enabled to obtain a large actual lifting area without having a large general area, which I consider objectionable, as it presents too much surface in lateral directions to side winds and counter currents of air, which occasionally strike one side of the machine only, throwing it out of balance. A further advantage of this construction is that by thus condensing the machine, the framework is lightened for a given required strength as the reaches are shorter. A further advantage is that a long car space is thereby provided for passengers. The preferable construction is that each plane overlaps an adjacent one one-half of its depth and is spaced vertically one-half of its depth. For instance, if the planes are four feet in depth they would overlap two feet and be spaced vertically two feet. However, I do not confine my claims to the specific proportions given, as these proportions may be varied considerably with good results, as, for instance over-lapping one-third and spaced vertically one-third of the depth.

The frame of such aeroplane consists of two laterally extending spars connected by ribs 50, 50', spaced apart about one-quarter of the length of the planes, and the side spars of the several planes are connected by vertical ties 51, 51', spaced the same distance apart as the planes are deep. In the central part of the machine there is a space having no planes of a length three and one-half times the depth of the plane and a width three-quarters of the same. In this space is contained the engine and its appurtenances, the controlling devices, and the car for the passengers.

The sheet material 52 which I prefer to use in forming these planes consist of wire netting. At first it would appear that such a material would permit the air to pass through it and therefore would not perform its function of buoying up the air-ship; but this is not the case, as the planes are in rapid motion relative to the air, which impinges against this wire netting or screen in a direction making a very small angle with its plane. Since air in motion tends to maintain its direction in a straight line, it naturally follows that the air will not turn up almost at right angles and go through the meshes. Of course the meshes are very fine, namely one or two one-hundredths of an inch, the wire being from .005 to .008 in diameter, so that a plane having 800 square feet of surface weighs 48 pounds and it is estimated that the same amount of surface will lift a total weight of 2800 pounds at the speed with which the ship is expected to travel. As the wires cause the air to glance off them and move downward in the path of least resistance, the planes are bowed downward to the rear, but as this movement is in a direction of continuous curvature, the plane acts on the air to deflect the relative movement of the air downward and away from itself. The advantages of this fabric are, first, there is obtained a great strength per given weight, namely, 320 pounds tensile strength per inch of cross section each way; second, if tinned, or otherwise covered, it will last indefinitely; third, the cost is one-tenth the price of silk; fourth, there is less resistance to the air, as the air, becoming entangled in the meshes, forms a lubricant and offers small resistance, yet it completely changes the course of the air to a downward direction. However, I do not confine my claims to wire cloth having open meshes only, for in my opinion wire cloth would be a great improvement over the present construction, even if closely woven, although it is heavier, as it would at least have strength, durability and cheapness. In order to avoid the objection of great weight, finer wire could be used if obtainable. In making this cloth the warp should be of soft tough wire and the woof of stiff straight woven music wire. The selvages would have a heavy wire in each side of the cloth and on the machine the warp would lie parallel with the line of flight and the straight woof wires would lie transverse thereto, as shown in Fig. 5. In said figure, 53 indicates the woof wire and 54 the warp wire. The arrow $a$ indicates the direction of flight; the arrow $b$ indicates the direction of motion of the air in contact with the plane in actual flight, and the arrow $c$ indicates the direction at which the air must strike the plane in order to get through it at all. The cloth is woven of a width equal to the depth of an aeroplane and the front and rear thus have steel strips 55 soldered to the ends of the woof, said strips being perforated and provided with eyelets 56 for lacing to studs on the spars of the aeroplanes.

Figs. 18 and 19 show a wire plane and a plane frame broken away at the ends of the spars. The ribs 50 are bowed downward from the front to the rear. From these ribs the screens of fabrics 52 forming the planes are stretched and are laced fore and aft to the next adjacent plane, if found desirable to do so. Said aeroplane being curved downward forces the on-rushing air down, and hence buoys up the plane and its load. The buoying power of a given plane area depends upon the angle which the plane makes with reference to the horizontal. The speed depends upon the same angle, upon the area, upon the motive power, and also upon the density of the air, although the latter factor is of little importance as to speed, as the propeller and the aeroplane are both in the same fluid.

Figs. 3, 4, 13 and 14 show means for alighting on water, consisting of air-float bags 57, which can be deflated and inflated, having sides 58 which fold in the manner of an accordeon. From each bag a tube 59 extends to a valve 60 near the operator and from the valve to a compressed air tank 61. When it is desired to alight upon the water the operator opens said valve and the compressed air quickly fills the bag. When not required for use on the water, a tube running through a suitable hand valve to the intake port of an air pump 64, provides means for completely exhausting the bags. They will then lie close to the frame of the machine, performing the functions of aeroplanes. Said bags are made of any suitable material in any desired shape to offer little resistance to the water when the ship is afloat and to the air in flight when the bags are deflated. To rise from the surface of the water the operator heads the ship to the wind, if there is any, and lowers the elevator rudder at its rear edge. This will allow the main planes to buoy up part of the weight, reducing the water resistance. He then increases the speed of the engine to full speed, and, by the time air passes at the rate of twenty miles an hour, the machine will rise from the water.

I do not confine my invention to the form of air bags here shown, as, for instance, a cylindrical float would be a good form of construction and could be designed to collapse out of the way in flight. Such floats could be made to serve two or more purposes to a better advantage than here shown, as, for instance, to serve both as a float and as an aeroplane.

66, 67, indicate two upper and lower vertical balancing rudders made of thin sheet steel or wire cloth, the front edges of which are secured to a vertical rod 45 hereinafter described. They are operated by means of cables passing over small pulleys to the drum of a controller. The arrangement is such that their rear edges move laterally in opposite directions, that is, if the right side of the machine is lower than the left the upper balancing rudder 66 should be moved to the right, and the lower balancing rudder 67 to the left, thus forming a left-handed screw, which, in rushing through the air, is itself caused to twist, and therefore twists the whole machine back to a level or horizontal plane. Should the machine tilt to the left, then the upper balancing rudder 66 should move past its normal central plane to the left and the lower one 67 to the right, forming a right handed screw, acted upon by the air through which it moves to screw to the right, and thus restore the plane to a level position. The balancing rudders are then brought to a central position. The cables 68, 68', 69, 69', which operate these rudders have their ends secured to the rudders on opposite sides and the middle of the cable passes once or twice around the controller drum 70 to give it gripping power. Thus, the cable 68 runs from the right hand side of the upper rudder 66 over the pulleys 71 to the upper central part of the machine to a pulley 72, and the cable 69' runs from the left hand side of the lower rudder 67, over pulleys 73, 74, to the same point. The two are then joined together in a central vertical plane and then a single cable 75 runs down over a pulley 76 to the controller drum 70, then over another pulley 76' to pulleys 75' on the vertical frame piece 45 supporting the rudders, dividing intermediate of the last two mentioned pulleys, one going to the left hand side of the rudder 66 and the other to the right hand side of the rudder 67. Thus as the controller drum rotates, the two rudders are pulled one to the left and the other to the right.

In the rear of the balancing rudders is the steering rudder 80 extending rearwardly from the rudder post 81 which is attached at the front edge rigidly to the rear frame, and is bowed, in a similar manner to the balancing rudders 66, 67, by means of a cable 82, running over pulleys 83, 83' mounted conveniently on the frame of the machine and pulleys 84, 84', at the forward edge of the second from the bottom main plane, and thence to the handle of the steering wheel 85 set in front of the operator's seat. This hand wheel has a circumferential groove in which the cable is received and is extended around said wheel once. The ends of said cable 82 are connected to opposite sides of the rudder. The steering is done manually, and the steering rudder may be set at a fixed position, and thus cause the machine to move either in a straight line or in a curve of constant curvature. Since the balancing rudders offer equal resistance to the air through which the ship passes, they will not in any position cause the machine to deviate from a straight ahead course. Moreover the action of the propeller, which is set ahead of them, has the effect of blowing the air back against them with increasing speed, thus increasing their balancing efficiency over what it would be if they were not set in the wake of the propeller.

On the front end of the machine is located the elevating rudder 90, the function of which is to change the direction of movement of the shaft in a vertical plane. This rudder is secured by its front edge rigidly to the transverse rod 34 and the whole rudder is bowed up or down, as required, by means of cables 92, 92', 93, 93', shown in Figs. 1 and 2, which, starting at the upper side of the rudder, pass over upper pulleys 40, 40', 41, 41' at the side of the machine. The two cables 92, 92', coming from the two sides of the machine, are then united to a single cable 94 which passes over a pulley 95, above the controller, then down to the controller drum around which it passes once or twice, and then upward to a pulley 95' above the controller, thence ahead and downward, and is then connected to the two cables 93, 93', which pass, one to the right and the other to the left, under pulleys 41, 41' and are then connected to the under side of the rudder frame. This rudder serves the purpose of steering upward or downward in the line of flight and is also operated automatically by a controller, hereinafter described, to maintain a predetermined angle of flight.

At the vertical center of the machine, between the rear portions of the side frame of the ship, is a horizontal plane 86 which serves as a tail plane.

Fig. 10 is a diagram of the motive power, the means for controlling the same, and the parts connected therewith, details of construction being omitted, because the devices themselves are all old and well known to those skilled in the arts to which they respectively appertain. The gas engine 96, which drives the propeller 97, also operates the air pump 63 at the front end of the crank case, which pumps air into the compressed air tank 61 through a pipe 100 having therein an automatic relief valve 101, which permits the escape into the atmosphere of air compressed above a predetermined degree. From the air tank 61 a pipe 102 leads to a hand valve 103, from which a pipe 104 leads to a high pressure gage 105 and a pipe 106 to an automatic pressure regulator 107, which reduces the pressure from about 500 pounds to 100 pounds per square inch. The compressed air tank is thus able to maintain a reserve of compressed air, sufficient, when reduced to the lower pressure, to operate the controlling mechanism for at least one-half hour after the pump has stopped pumping. From the pressure regulator 107, a pipe leads to a low pressure gage 108 and also to a compressed air motor 99, the shaft of which operates the main shaft 109 of the controlling means and also the electric generator 110 at the end of the base plate 111.

In Figs. 6, 7, 8 and 9 are shown the automatic controlling devices. The motor 99 drives a central shaft 109 directly connected thereto, which in turn is directly connected to the electric generator 110. Said shaft 109, through gearing 113, drives four clutches 114, arranged in two pairs, the clutches of each pair being loose on the same shaft 115, upon which shaft is secured a worm 116. One worm shaft 115 is for controlling the balancing rudders and the other for controlling the elevating rudder. Said worms drive worm gears 117 mounted upon independent shafts, having bearings 118 beneath the base plate, and rotating in openings 119 through said plate. Attached to the spokes of the worm gear and concentric therewith are drums 120, one for each gear, which rotate in said openings 119. The cable 121 from the balancing rudders or steering rudder passes through a slot in the base plate down and once or twice around the drum in order to firmly grip said drum and back up through a slot 122 in said plate on the other side of the drum and thence over pulleys properly located to the balancing rudders, or steering rudder. The clutches of the two pairs are on opposite sides of the central shaft 109, and the gearing is such that the clutches of each pair revolve in opposite directions to one another. In Fig. 6, one of said clutches is shown in section, and comprises a rotating electro-magnet 123 and a corresponding circular armature 124 slidably keyed to the worm shaft. In this sectional view, the worm shaft 115 extends integrally through both clutches and bearings. Around this is a hardened steel sleeve 125 stationary in the bracket bearing 126, in which sleeve said shaft revolves. Around this is the clutch core 127 bored to rotate on the sleeve, on the outside of the hub of which is secured the gear wheel 128 of the clutch. 129 indicates the magnet coil, 130 the back of the clutch cylinder, 131 the outer cylindrical wall of the clutch, having an insulated pair of holes 132 through which each end of coiled wire 138 is laid out to the collector rings 133. 134 indicates cylindrical fiber insulation, on which the two collector rings are secured. 135 indicates the internally tapering friction shoe ring made of bronze, fiber or other non-magnetic and durable material. Its taper is such that there is no tendency to stick or cling after the current ceases. The ratio of gearing between the clutch and the worm wheel is 80 to 1 and between the worm wheel and drum 5 to 3. It will be noticed that a small current of electricity will thus exert great power in pulling the rudders into operative positions, and, by reasons of the high speed of the clutches, it will effect this result quickly.

There is but one magnetic gap in the main circuit, as the core 127 of the magnet is of iron, the sleeve 125 of hardened steel, and the armature 124 of soft cast iron. The armature never completely makes contact with the magnet; hence it has no tendency to cling to the magnet by residual magnetism.

The graphite brushes 136 are held in suitable holders to which the contact wire may be attached.

The four clutches are of similar make and equipment. Each worm shaft 115 is free to turn in either direction, according as it is acted upon by the clutch which is energized, or which has the greatest energy when both have electricity passing through their coils at the same time. This latter condition would be possible when using a vacuum mercury tube as a circuit controller, as, when, at one side of the tube, there is nearly metallic contact and at the opposite side a wider gap. Then, although the current is flowing in parallel through both vaporized gaps, yet the clutch corresponding to the gap of smaller resistance would receive more of the high voltage current than the other, and would revolve the worm shaft accordingly, the other clutch slipping.

The controller is more particularly shown in Fig. 12. It comprises a glass tube 136, the interior of which is filled with mercury to the level shown, the remainder of the interior of the tube being in a vacuum. Good results may be obtained, however, without using a vacuum, provided there is a vent at the top to allow expansion, in which case vaporized mercury would escape when in use. This could be prevented by covering the mercury with water or other comparatively high resistance and cooling liquid, the action of which would be to condense the mercury vapor before it passes the liquid. In this case a low voltage current would be used. When a vacuum tube is used, the mercury in the bulb condenses and flows back to the contact tube. The passage 138 across between the two contact chambers is for the purpose of insuring a uniform level of mercury on each side, since otherwise one side might vaporize more mercury than the other, by making contact more frequently, and thus, if inclosed in a small space, might create pressure and the actual level of mercury would be different from the level of the two contact pins 139. 140 are electrodes to which the conducting wires 141 are secured, said wires leading to the clutches 114, thence to the generator 110, from the other side of which a wire 142 leads back to a contact point 143 in the lower portion of the tube 136. The loop 144 in the tube is to prevent the mercury from jolting from side to side and thus making a false contact. This tube may be made in various forms, but I prefer the form shown in the drawing.

Fig. 11 is a diagrammatic view of the general electrical arrangement, in which 136 is the mercury contact tube for the balancing rudders, 136 is a similar tube for the elevating rudder, and 145 is a lever on which the tube 136 is pivotally mounted, so that it may be turned upon its pivot in a vertical plane. 146 is a sextant graduated to indicate the angle to which the lever 145 and the tube 136 are set. To steer up or down, the operator moves the rear end or handle of the lever down or up respectively. 114 indicates the two clutches for controlling the elevator rudder, running in opposite directions at 1500 or 2000 revolutions a minute, and 114 are the two similar clutches for controlling the balancing rudder. From one side of the generator 110, which is direct current, a wire 147 leads to the four clutches. From the clutches 114, 114 two wires 141, 141, lead to opposite sides of the contact tube 136, and from the clutches 114, 114 wires 141, 141 lead to opposite sides of the contact tube 136. From the middle points of the contact tubes, wires 142, 142, lead back to the other side of the generator through a hand switch 148.

In order to rise, the controller tube is turned down at its free end, which is to the rear, thus causing the mercury to contact with one of the electrodes, and energizing the corresponding clutch, which causes the cable drum to revolve, drawing the rear edge of the elevating rudder down, so that the air, pressing against its under bowed side, raises it, and causes the main planes to grip more air, and thus increase their elevating power. Let us suppose that the operator moves the lever to an angle of 8° from the horizontal. Now when the machine reaches an angle of 8°, the tube will be level and the circuit broken, but the rudder will still be bowed so that the machine will be tilted at a greater angle than 8°. But when it does so to the extent of 1½° more, then the tube will make contact at the opposite end and pull the elevating rudder up, and past the center, and the angle of inclination of the elevator to a horizontal plane will decrease. When it decreases to less than 8°, then the contact previously made will break, and the contact of the elevating end will close, and again increase the angle of elevation of the rudder. As the action of the clutches is instantaneous the plane will be bowed up or down very shortly after the machine has passed the inclination corresponding to the mercury. Hence the contact will be made alternately on the two ends of the contact tube three or four times, and then the machine will finally settle at the desired angle of 8°. Should the wind blow the machine out of this angle in the line of flight, contact will be made when a variation of the 1½° has been reached, whereupon the elevator rudder plane is moved to the original angle. When the machine has reached the desired height, the lever is moved back parallel to the body of the machine. Contact is made and the upper movement of the rudder follows. After being alternately depressed and elevated a few times, the machine will fly in a horizontal plane, and will maintain this direction in opposition to the aerial influences to the contrary.

It can now also be readily seen that, by the flying machine tipping to one side, contact will be made to energize one of the clutches, this causing the armature of the clutch to revolve, and with it the worm and drum, thereby drawing up one side of the cable and slacking off the other side. This has the effect of moving the rudders into a position in which they form a screw, tending to screw the flying machine back into a horizontal position. Should it go too far and lean the other way, the other clutch will be energized, and cause the rudders to be operated in the opposite direction, making a screw having the opposite effect, and so on, until the ship is brought to a level position. It is to be understood that the contact points of the mercury tube used to close the circuit to energize the clutches for the balancing rudders are set so that they are horizontal when the machine is level, and the column of mercury is just enough below them to make contact when the machine tips through 1 or 1½° of a circle. The controlling mechanism for said balancing rudders will thus act almost the instant tipping commences, and as the rudders are quick in action they will not remain long in a screw position. The limit to which the rudders may be pulled to one side is determined by stop cables, not shown, spliced to the drum cable and fastened to the frame work of the flying machine, which will allow a limited motion, and then if the clutch is still attracting the armature, it will be forced to slip over the same. The elevating rudder motion is also limited in the same manner. Its operation depends upon the contact tube closing the circuit energizing that one of the clutches which will operate the rudder in a direction which will cause the flying machine to assume a position that will bring the mercury tube to a level with reference to its two contact ends. In turning corners or describing angles with the flying machine, the balancing control will automatically cause the machine to lean to the center of the circular course, since the centrifugal force attendant upon a turning movement would naturally force the mercury in the direction of radius of the circle being described, that is, to the outer side of the tube, and make contact and operate the balancing rudders to cause the machine to assume an angle, that will permit the force of gravitation to equal and neutralize the centrifugal force, thus avoiding the tendency, when turning, to slip laterally from off the buoying air.

The object of using compressed air to drive the controlling clutches and generator is to have stored up power available for that purpose in case the engine shaft should fail to operate properly, or exhaust its supply of fuel, and in such case the operator will have twenty or thirty minutes' warning, in which time to turn the machine to the earth or to the surface of the water, the tank holding air sufficient to float the air bags. In addition to the automatic control for the balancing and elevating rudders, means for operating them manually would be supplied for use in case of emergency. The same are not shown in the drawings, there being no invention in so operating them.

Figs. 20–27 show a modified form of balancing plane which can be applied to a biplane or an aero-plane; of these, Fig. 25 is the figure showing best the balancing planes and operating cables. In this manner of balancing I use the device whereby the angle of incidence is not changed for the purpose of balancing by warping, bowing, or turning on their axes, the lateral planes at their lateral extremities but rather to have at the side of the machine two planes, one of which slopes rearward and downward, and the other rearward and upward and so devised that they can be contracted or expanded, thus changing their relative area tending to raise or depress the machine. When one is extended the other is contracted, on both sides of the flying machine at the same time, so as to present more angular surface on the lower plane at the low side of the machine and less on the upper plane, while on the higher side of the machine greater angular surface is exposed by the upper plane and less by the lower plane, thus tending to lift the lower side of the flying machine and to depress its higher side. This is done by making the planes in rectangular sections 151, mounted upon wires 152 stretched between upright and cross spars. The sections are made of thin metal and have sleeves 153 soldered thereto, which sleeves surround the supporting wires 152 at each end of the sections and at their two lateral edges. They slide on said wires in planes one above the other and do not quite uncover one another when extended fully. The uppermost plane section of the upper set and the lowermost plane section of the lower set are cabled together over laterally-outrigged pulleys 154 by a length of cable 155 that will allow the upper set to be extended when the lower set is fully contracted. The two upper sections of the upper set are cabled together at their inner edges by a length of cable 156 allowing one side to be extended while the other side is fully contracted. The inner edges of the two lower plane sections of the lower sets are provided with cables 157 reaching toward the center of the machine then running over pulleys 158 and back to the outer edges of the main planes, where they are secured. The above mentioned pulleys 158 are linked together by a cable 159 passing around the controller drum. The object of this arrangement is to reduce the amount of motion required by one-half.

In Fig. 23 it is to be noticed that the section 151$^a$ is mounted on a wire 152$^a$ by a sleeve 153$^a$ at each of its two edges, while the section 151$^b$ is mounted on the wire 152$^a$ at its right edge by a sleeve 153$^a$ and on the wire 152$^b$ at its left edge by a sleeve 153$^b$. The section 151$^c$ is mounted on the wire 152$^b$ by sleeves 153$^c$ at both edges, but at its left edge the sleeve 153$^c$ is inside of the sleeve 153$^b$ of the section 151$^b$ and the right hand sleeve of the section 151$^b$ is inside of the left hand sleeve of the section 151$^a$. The section 151$^d$ is fixedly mounted independently of the others on the wire 152$^d$. It may be easily seen that the section 151$^a$ when moving to the right, will move the section 151$^b$ with it, when its left sleeve has reached the right sleeve of plate 151$^b$, and so on. The left sleeve of section 151$^b$ draws the section 151$^c$ out by coming in contact with its right sleeve. In returning the right sleeve of section 151$^c$ contacts with the left sleeve of section 151$^b$ and forces it back to the left, while the left sleeve of section 151$^b$ forces the left sleeve of 151$^a$ back, and they move over section 151$^d$ to their neutral position. Here I have shown rigid planes made so by soldering a plate 161 to a corrugated plate 162 (Fig. 20) but a flexible plate may do just as well, if not better, and much lighter.

The extent of motion is limited by a stop cable fastened to the frame of the machine and to the movable cable, and normally is slack. It becomes taut when the cable has moved to the limiting position of the plane, and it thereby causes the clutch to slip, if still revolving.

The planes may be made either of wire alone, as specified, with meshes open or closed by oiling, painting, or tinning, or of part wire and part silk, or cotton, or other fabric, or of wire close woven. The ribs may be made of steel plate, curved edgewise to give the plane its shape, set with the edges up and down, and laced to the wire cloth to prevent bowing sidewise along their length, the lacing being made with wire, or with threaded wire clevises. The non-stretching fabric would of course cause the ribs to take the strains directly edgewise, not allowing them to bow to either side; it would be lighter than wood, more resilient and stronger, and, when made in large quantities, cheaper.

I claim:—

1. In an air ship, a propeller, an engine for operating said propeller, an air pump operated by said engine, a compressed air tank, a connection between said air pump and compressed air tank, an automatic relief valve in said connection, a pipe leading from said air tank, an automatic pressure regulator adapted to reduce the pressure in said pipe, controlling mechanism for the air ship, and a pipe leading from said pressure regulator to said controlling mechanism, as substantially described.

2. In an air ship, a propeller, an engine for operating said propeller, an air pump operated by said engine, a compressed air tank, a connection between said air pump and compressed air tank, a pipe leading from said air tank, an automatic pressure regulator adapted to reduce the pressure in said pipe, a compressed air motor, a pipe leading thereto from said pressure regulator, and controlling mechanism operated by said compressed air engine, substantially as described.

3. In an air ship having adjustable planes, means for adjusting said planes comprising a motor, an electric generator driven by said motor, two parallel operating shafts, two clutches loose on each shaft, said clutches being driven by the motor, each clutch comprising a rotating electro-magnet energized by the generator, and an armature slidably keyed to the shaft, and adapted to be attracted by said magnet, substantially as described.

4. In an air ship having adjustable planes, means for adjusting said planes comprising a motor, an electric generator driven by said motor, an operating shaft, two clutches loose on said shaft, said clutches being driven by the motor, each clutch comprising a rotating electro-magnet energized by the generator, and an armature slidably keyed to the shaft, and adapted to be attracted by said magnet, substantially as described.

5. In an air ship having adjustable planes, a motor, an electric generator driven by said motor, two parallel operating worm shafts, a worm gear meshing with each worm, a drum rotated by said gear, a cable on said drum for operating the planes of the air ship, two clutches loose on each shaft, said clutches being driven by the motor, each clutch comprising a rotating electro-magnet energized by the generator, and an armature slidably keyed to the shaft, and adapted to be attracted by said magnet, substantially as described.

6. In an air ship having adjustable planes, a motor, an electric generator driven by said motor, two parallel operating worm shafts, a worm gear meshing with each worm, a drum rotated by said gear, a cable on said drum for operating the planes of the air ship, two clutches loose on each shaft, said clutches being driven by the motor, each clutch comprising a rotating electro-magnet energized by the generator, and an armature slidably keyed to the shaft, and adapted to be attracted by said magnet and means for preventing contact between the armature and the magnet, substantially as described.

7. In an air ship having adjustable planes, a motor, an electric generator driven by said motor, a worm shaft, a worm gear meshing with said worm, a drum rotated by said gear, a cable on said drum for operating a plane of the air ship, two clutches loose on said shaft, said clutches being driven by the motor, each clutch comprising a rotating electro-magnet energized by the generator, and an armature slidably keyed to the shaft, and adapted to be attracted by said magnet, substantially as described.

8. In an air ship having adjustable planes, a motor, an electric generator driven by said motor, a worm shaft, a worm gear meshing with said worm, a drum rotated by said gear, a cable on said drum for operating a plane of the air ship, two clutches loose on said shaft, said clutches being driven by the motor, each clutch comprising a rotating electro-magnet energized by the generator, and an armature slidably keyed to the shaft, and adapted to be attracted by said magnet and means for preventing contact between the armature and magnet, substantially as described.

9. In an air ship, the combination of a controlling plane, a cable operatively connected with said plane, a drum around which said cable is wound, a shaft for said drum, armatures rotatable with said shaft but slidable thereon, constantly rotating electro-magnets for said armatures, circuits for energizing said magnets, and means for controlling said circuits, comprising a tube, a conducting liquid, contacts in said tube, one of said contacts being always in contact with the liquid and connected to one side of both circuits and the other contacts being caused to contact therewith, each exclusively of the other, by a movement of liquid in the tube, and being connected to the other side of said circuits, substantially as described.

10. In an air ship, the combination of a controlling plane, a cable operatively connected with said plane, a drum around which said cable is wound, a shaft for said drum, armatures rotatable with said shaft but slidable thereon, constantly rotating electro-magnets for said armatures, circuits for energizing said magnets and means for controlling said circuits, comprising a tube having a loop, a conducting liquid and contacts in said tube, one of said contacts being always in contact with the liquid and connected to one side of both circuits, and the other contacts being caused to contact therewith each exclusively of the other, by a movement of the liquid in the tube, and being connected to the other side of said circuits, substantially as described.

11. In an air ship, the combination of a controlling plane, a cable operatively connected with said plane, a drum around which said cable is wound, a shaft for said drum, armatures rotatable with said shaft but slidable thereon, constantly rotating electro-magnets for said armatures, circuits for energizing said magnets, and means for controlling said circuits, comprising a tube having a loop, a conduit connecting the upper ends of the said tube, a conducting liquid and contacts in said tube, one of said contacts being always in contact with the liquid, and connected to one side of both circuits, and the other contacts being caused to contact therewith each exclusively of the other, by a movement of the liquid in the tube, and being connected to the other side of said circuits, substantially as described.

12. In an air ship, an elevator rudder, a drum and operative connections from said drum to said rudder to control the same, a shaft for rotating said drum, armatures slidable on said shaft and rotatable therewith, electro-magnets constantly rotated in opposite directions relatively to said shaft, electric circuits for energizing said magnets to attract the respective armatures, and means for controlling said circuits, comprising a lever, a substantially U-shaped tube on said lever, mercury therein, an electric contact at the bottom of said tube connected to both electric circuits, and electric contacts in the upper portions of the tube, normally above the level of the mercury, connected to the respective circuits, substantially as described.

13. In an air ship, the combination of a propeller, an engine for operating the same, an air pump driven by said engine, a compressed air tank for containing the air compressed by said pump, an engine driven by the compressed air, a constantly rotating electro-magnetic clutch driven by said engine, an electric generator driven thereby, the coil of the clutch receiving its current from said generator, a shaft for controlling the air ship, and an armature for said clutch rotating with said shaft and slidable thereon, substantially as described.

14. In an air ship, means for controlling said ship, an electro-magnet for regulating said controlling means, an electric circuit for energizing said magnet, and a circuit controller in said circuit, comprising a tube having a loop, and mercury in said tube adapted by a change of level of the tube to affect the current in said circuit.

In testimony whereof I have hereunto set my hand in the presence of two subscribing witnesses.

NEWTON B. CONVERSE.

Witnesses:
 ALICE KELLY,
 L. L. CORY.